(12) United States Patent
Specht

(10) Patent No.: US 9,550,625 B2
(45) Date of Patent: Jan. 24, 2017

(54) ROLLER-WAY CONVEYOR

(71) Applicant: D'ARTECON SAGL, Arcegno (CH)

(72) Inventor: Dieter Specht, Arcegno (CH)

(73) Assignee: AVANCON SA, Riazzino (CH)

( * ) Notice: Subject to any disclaimer, the term of this patent is extended or adjusted under 35 U.S.C. 154(b) by 115 days.

(21) Appl. No.: 14/405,853

(22) PCT Filed: Jun. 6, 2013

(86) PCT No.: PCT/IB2013/001177
§ 371 (c)(1),
(2) Date: Dec. 5, 2014

(87) PCT Pub. No.: WO2013/182888
PCT Pub. Date: Dec. 12, 2013

(65) Prior Publication Data
US 2015/0183583 A1    Jul. 2, 2015

(30) Foreign Application Priority Data
Jun. 7, 2012 (IT) .............................. RM2012A0264

(51) Int. Cl.
| B65G 13/07 | (2006.01) |
| B65G 39/12 | (2006.01) |
| B65G 13/11 | (2006.01) |
| B65G 13/02 | (2006.01) |
| B65G 13/04 | (2006.01) |

(52) U.S. Cl.
CPC .............. B65G 13/07 (2013.01); B65G 13/02 (2013.01); B65G 13/04 (2013.01); B65G 13/11 (2013.01); B65G 39/12 (2013.01)

(58) Field of Classification Search
CPC .......... B65G 13/07; B65G 13/11; B65G 39/12
USPC .............. 198/789, 790, 860.3; 193/35 R, 37
See application file for complete search history.

(56) References Cited

U.S. PATENT DOCUMENTS

| 2,593,089 | A | * | 4/1952 | Dodge ......................... 193/35 R |
| 5,657,854 | A | * | 8/1997 | Chen et al. .................... 198/787 |
| 6,286,660 | B1 | * | 9/2001 | Kalm ............................ 198/782 |
| 7,243,784 | B2 | * | 7/2007 | Cotter et al. ................ 198/861.1 |
| 7,607,527 | B2 | * | 10/2009 | Yazaki et al. ............... 193/35 R |
| 8,307,976 | B2 | * | 11/2012 | Kratz et al. ................... 198/788 |
| 2011/0139589 | A1 | | 6/2011 | Agnoff |

OTHER PUBLICATIONS

International Search Report, dated Jul. 2013, from corresponding PCT application.

* cited by examiner

*Primary Examiner* — Leslie A Nicholson, III
(74) *Attorney, Agent, or Firm* — Young & Thompson

(57) ABSTRACT

A conveying system includes: two axially spaced supporting tubular frames extending substantially parallel in the conveying direction (F) of the conveying system; at least one plurality of driving rollers and/or wheels; at least one plurality of supporting shafts, each adapted to be engaged in at least one of the supporting tubular frames to support at least one driving roller and/or at least one driving wheel; at least one first supporting bearing (7) for each supporting shaft. The conveying system (100) further includes at least one housing (8) for the at least one first supporting bearing (7). The housing includes fastening elements (9) to removably fasten the housing (8) and bearing (7) held therein within at least one supporting tubular frame.

14 Claims, 9 Drawing Sheets

ROLLER-WAY CONVEYOR

FIELD OF THE INVENTION

The present invention relates to a new roller and/or wheel conveying system in a roller and/or wheel path.

Known Art

Roller and/or wheel conveying systems have been known for more than a hundred years and usually they comprise a plurality of rollers and/or wheels arranged to determine a feed path for products, such as parcels, suitcases, letters or packages in general, between an operative station and the following one.

These systems have a wide area of applicability such as post offices, airports and different kind of manufacturing or logistic industries involving the product handling among several operative stations in the production process or in the handling system thereof.

A generally relevant problem found in the field by the Applicant is represented by the construction and assembly complexity of the known systems and, in particular, of their driving assemblies.

This complexity makes maintenance and/or cleaning operations difficult and time-consuming requiring also for this purpose the use of specific assembling tools.

The Applicant further found that another serious problem in the filed is represented in that the driving assemblies are outside with respect to the supporting frame and thus they can be dangerous and cause accidents to the operators working in the area where they are positioned or they can damage the products conveyed by the system itself.

The driving assemblies having no covers and being substantially at sight as regard to the structure supporting frames further makes the overall system unpleasing to the sight because heavy and unaesthetic.

So, the Applicant found the need for a new, easy to build, conveying system wherein the motion transmission system is protected from dirt, from the unwanted contact with the operators or items conveyed by the system itself, and that can be easy to access to for maintenance and/or cleaning and assembled without special assembling tools.

SUMMARY OF THE INVENTION

Therefore, in its first aspect the invention relates to a conveying system comprising:
- two axially spaced supporting tubular frames extending substantially parallel in the conveying direction of the conveyor;
- at least one plurality of driving rollers and/or wheels
- at least one plurality of supporting shafts, each adapted to be engaged in at least one of said supporting tubular frames to support at least one driving roller and/or at least one wheel;
- at least one supporting bearing for each supporting shaft;
- characterized by comprising at least one housing for said supporting bearing;
- said housing comprising removable fastening means to removably fasten said housing and bearing held therein within at least one supporting tubular frame.

Preferably, the fastening means comprise anchoring elements adapted to be engaged in a removable manner with ribs formed on the inner side walls of said tubular elements.

Advantageously, the ribs axially extend inward the supporting tubular frame and have a portion provided with an enlarged cross section at their free end.

In the present invention scope the terms "axial", "axially", denote a direction substantially perpendicular to the feed direction (F) of goods in the conveying system. In the present invention with the expression "enlarged cross-section portion" with reference to the rib is intended a portion which has a larger cross-section, i.e., a thickness greater than that of at least one portion of rib 13 placed upstream with respect to its free end. The present invention, in the afore said aspect, may present at least one of the preferred characteristics herein after described.

Preferably, the conveying system comprises a driving assembly held within at least one supporting tubular frame and at least one motor to drive said driving assembly.

Advantageously, the driving assembly is preferably integrally held within at least one supporting tubular frame.

Preferably, the fastening means comprise anchoring means adapted to removably engage in ribs obtained on inner side walls of said tubular elements.

Advantageously, the anchoring elements comprise juts projecting from said housings comprising a stop element arranged to abut against the enlarged cross-section portion of said ribs.

Preferably, the projecting juts are flexible.

Advantageously, the driving assembly is held within at least one supporting tubular frame.

Preferably, the housing comprises at least two reciprocally moving portions between a closing position, in which a seat for the supporting bearing is determined, and an open position in which said two portions are at least partially spaced.

Advantageously, the system comprises at least one second supporting bearing for each supporting shaft.

Advantageously, the driving assembly comprises at least one pulley and at least one drive belt or a chain.

Advantageously, the driving assembly comprises at least one pulley for each supporting shaft operably connected by means of a drive belt to the pulley of the adjoining supporting shaft and/or to the motor.

Preferably, the supporting frame comprises two half-shells joined together by locking means.

Advantageously the two half-shells of the same tubular element are symmetric with respect to their extending direction. Preferably, each support frame includes a cross member comprising at least a fork element provided with at least two prongs and a cantilever adapted to be coupled with the prongs of the fork element.

Conveniently, the supporting shaft crosses the tubular element and it is supported and locked in position with respect to the axially outer wall of the tubular element itself by means of a further housing in its turn constrained by two ribs.

BRIEF DESCRIPTION OF THE DRAWINGS

Further characteristics and advantages of the invention will be more evident from the detailed description of some preferred embodiments, but not exclusive, of a new roller and/or wheel conveying system in a roller and/or wheel path according to the present invention.

Such a description will be hereinafter explained referring to the attached drawings, provided for purposes of illustrations only, and thereby not limitative, wherein.

DETAILED DESCRIPTION OF SOME EMBODIMENTS OF THE INVENTION

Figure 1:
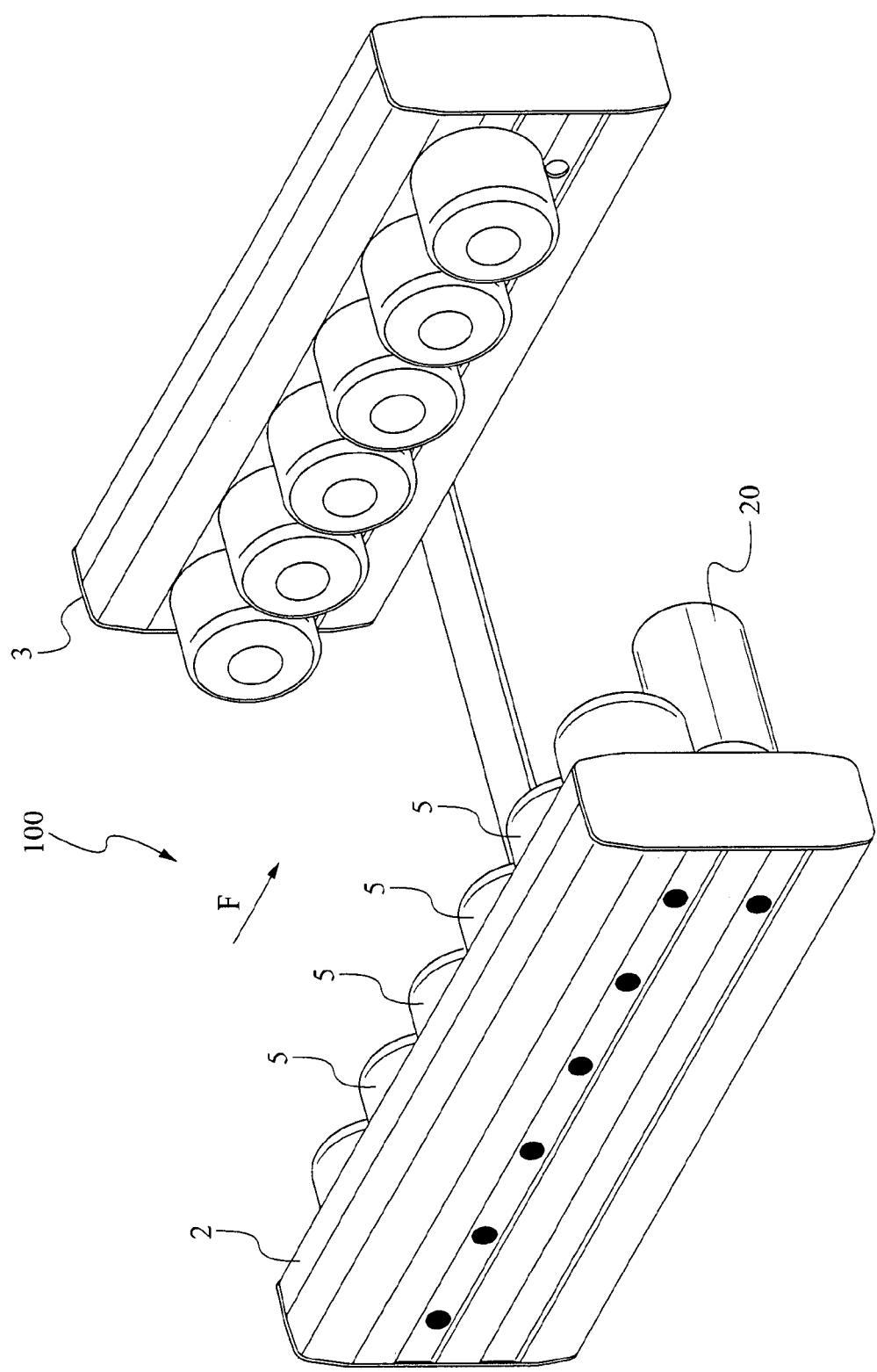
FIG. 1 is a schematic prospective view of a first embodiment of a conveying system according to the present invention.

Referring to FIGS. 1-8, a conveying system, according to the present invention, is identified with the reference numeral 100.

The conveying system 100 has at least two axially spaced supporting tubular frames 2, 3 extending substantially parallel one another in the conveying direction of the conveyor 100. The conveying direction indicated by the arrow F in figures, indicates the extending direction of the conveyor 100.

A plurality of driving wheels 5 or rollers 4 is located between the two supporting tubular frames 2, 3.

The driving wheels 5 or rollers 4 are rotatably mounted each on a supporting shaft 6 and they are operated by the driving assembly and a motor described in detail afterwards.

In the embodiment shown in the figures, the conveying system or conveyor 100 comprises a plurality of driving wheels 5 for each supporting tubular frame 2 or 3.

In other words, for each supporting tubular frame 2 or 3 there is a plurality of driving wheels 5 placed side by side which extend substantially along the whole length of the conveying system 100.

Each supporting shaft 6 is adapted to be engaged in at least one of said supporting tubular frame 2 or 3 to support at least one roller 4 and/or at least one wheel 5.

In detail, each supporting shaft 6 is rotatably constrained to the supporting tubular frame 2 or 3 by means of at least one bearing 7, preferably two bearings arranged at the axially opposed inner walls of each tubular element 2 or 3.

The bearing 7 is not directly constrained to the supporting tubular frame 2 or 3, but it is held by the latter through a suitable housing 8.

Preferably, the bearing 7 is a ball bearing, but a different bearing, such as for example a plain bearing, may be provided without departing from the protection scope of the present invention.

Each housing 8 is in the shape of a parallelepiped with a predetermined maximum height H and it consists of two parts or portions adapted to open and close.

The two parts or portions, once closed and inserted between two apposite ribs 13, better detailed hereinafter, remain closed just because two opposite sides of the housing 8 abut between the two ribs 13.

In an alternative embodiment the two parts or portions are adapted to open and close by means of a side hinge. The opening and the subsequent re-closing of the two portions of the housing allows positioning and accommodating said bearing 7 inside it in a specific circular seat 12.

The housing 8 includes fastening means 9 to removably fasten the housing itself and the respective bearing 7 inside at least one supporting tubular frame 2 or 3.

The construction and the subsequent maintenance operations of the conveying system 100 are made easy and quick by the fastening means 9, since the housing 8 and the respective bearing 7 can be easily removed from the inner wall 22 of the supporting frame 2 or 3 and repositioned.

For this purpose, the fastening means 9 comprise anchoring means 10 adapted to removably engage in ribs 13 obtained on inner side walls 22 of said tubular elements 2 or 3.

In particular, on the inner wall 22 of the tubular frames 2, 3 there are pair of ribs 13 extending substantially all along the conveying system 100.

As used in the present invention scope, extending direction or extension of the conveying system is intended as a direction substantially parallel to the feeding direction (F) of goods in the conveying system itself.

In each pair, the ribs 13 are positioned at a distance substantially equal or slightly greater than the maximum height H of the housing 8.

The ribs 13 positioned on the inner portion 22 of each tubular portion 2 or 3 axially extend inward the tubular frame and they have an enlarged cross section portion 14 at the free end thereof.

Advantageously, the anchoring elements 10 comprise juts 23 projecting from said housings 8 and shaped to form a groove 24 for interlocking fitting of an enlarged cross-section portion 14 of said rib 13. The projecting juts 23 are preferably L-shaped and they also comprise a stop element 25 adapted to abut against the enlarged section portion 24 of said ribs 13.

Preferably, the projecting juts 23 are flexible to allow the insertion of the enlarged section portion 14 and of part of the rib 13 inside the groove 24 formed by the structure of the projecting juts 23 themselves.

Figure 2:
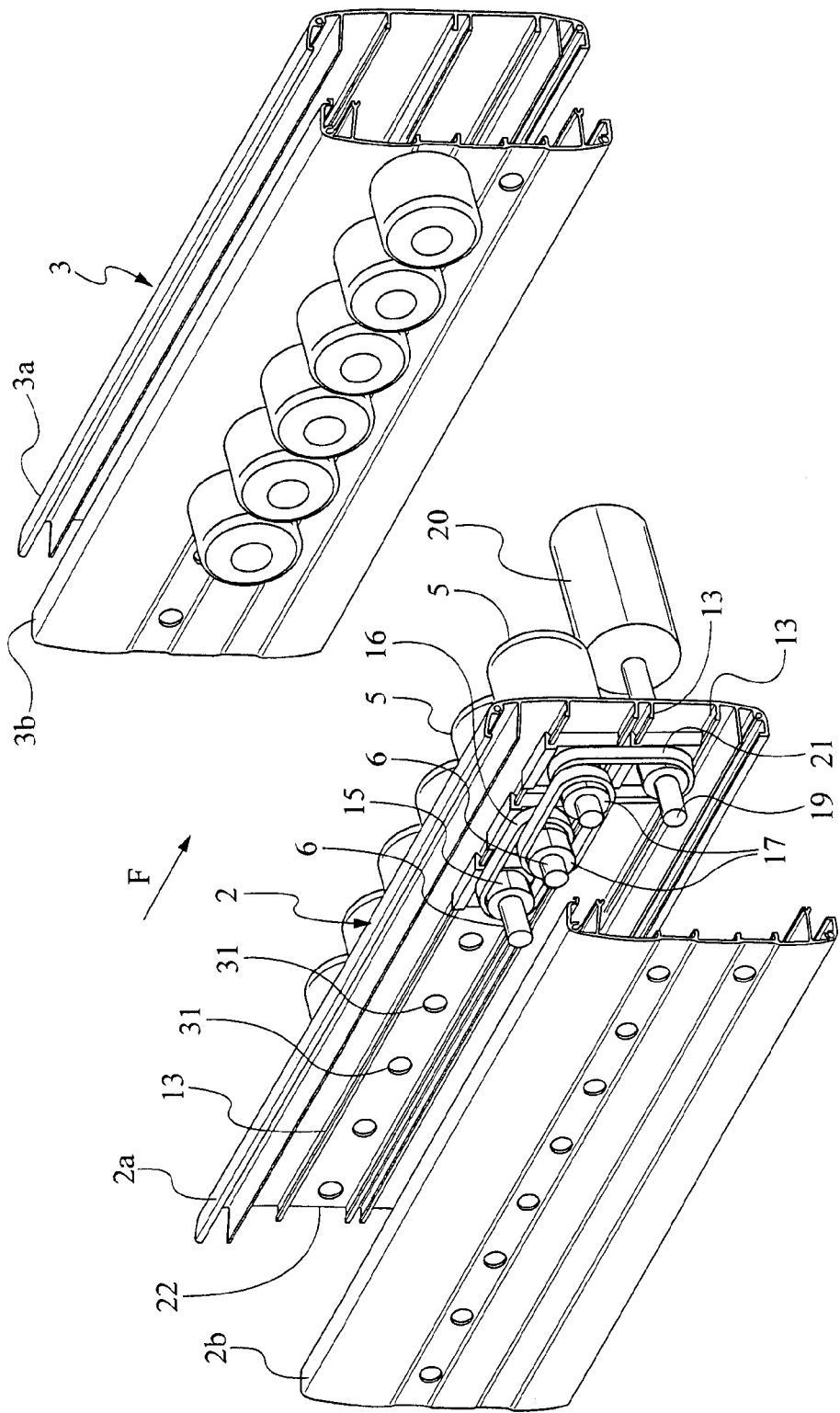
FIG. 2 is a schematic partially exploded view of the conveying system shown in FIG. 1.
Figure 3:
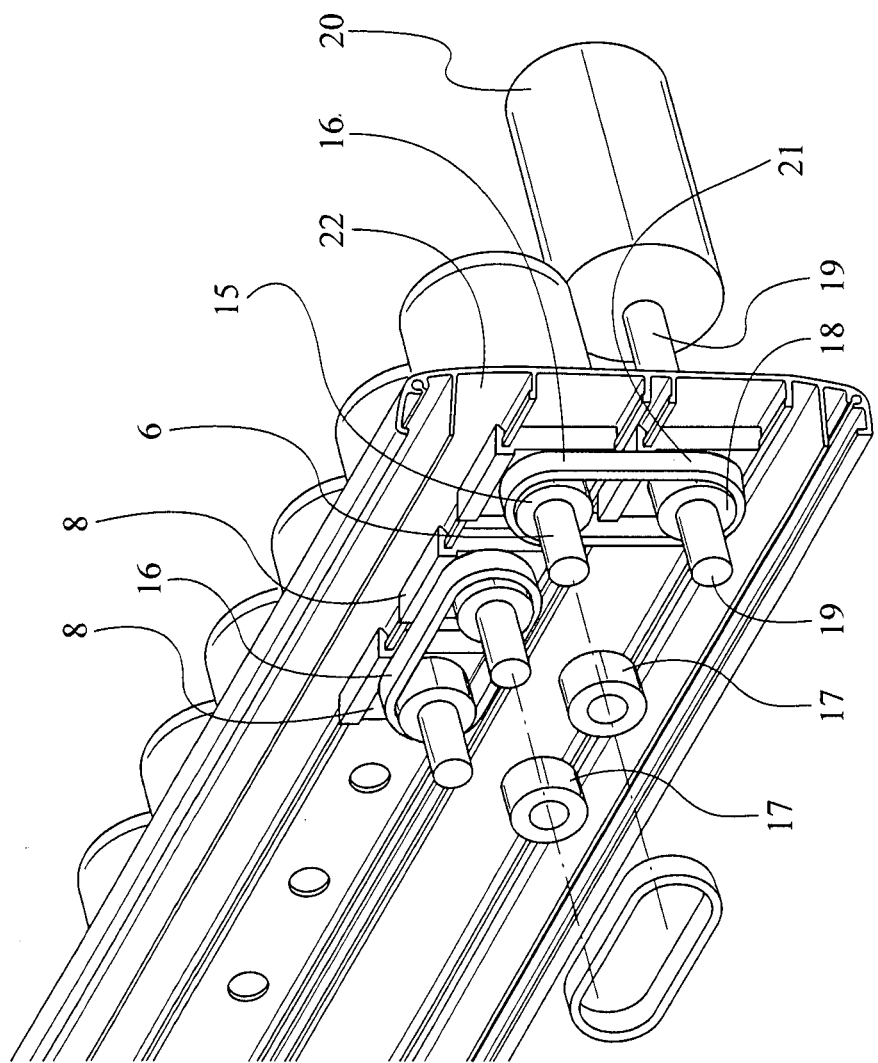
FIG. 3 is a schematic exploded view for detecting, storing and reading the operating parameters, such as temperature and pressure, according to the present invention.
Figure 4:
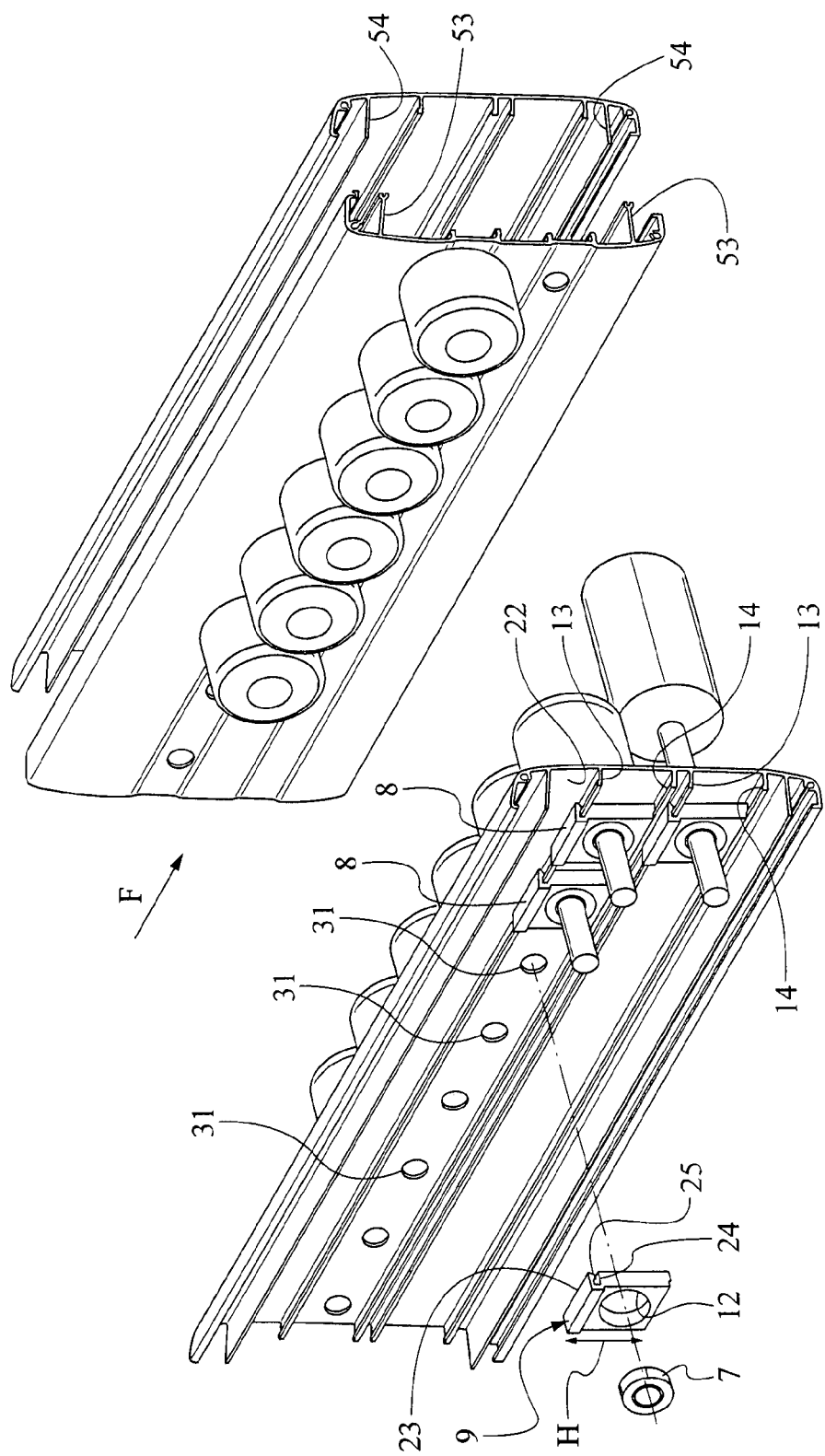
FIG. 4 is a schematic exploded and enlarged view of a fastening means.

Once the housing 8 is positioned between the ribs 13 of a pair, as shown for example in FIGS. 2-4, the lower rib 13 supports the housing 8 as a bracket, whereas the free end, and in particular its enlarged cross-section portion 14, of the upper rib wedges in the groove 24 formed by the projecting jut 23.

At this point, the abutment of the stop element 25 against an enlarged cross-section portion 24 allows for the anchorage in place of the housing 8 with respect to the inner wall 22 of the supporting tubular frame 2 or 3.

In particular, each wall of the supporting tubular frame 2 or 3 has a set of through holes 31 each adapted to pass a supporting shaft 6 of a driving roller 5 or wheel 4.

In other words the supporting shaft 6 comes into the axially most inside wall of the tubular element 2 or 3 and it crosses the latter up to engage in the axially most outside wall of the tubular element itself.

Each housing 8 is fastened in such a position of the inner wall 22 of the supporting tubular frame 2 or 3 allowing for the engage of the supporting shaft 6 and the bearing 7 held inside the housing 8.

At least one shim washer, not shown in figures, can be provided between the housing 8 and the inner wall, keyed on the supporting shaft 6.

The supporting shaft 6, crossing the tubular element 2 or 3, is supported and locked in position with respect to the axially outer wall of the tubular element itself by a further housing 8 in its turn constrained by means of two ribs 13.

Also the afore said housing comprises a bearing in its inside.

Each supporting shaft 6 engaged in at least a bearing 7 further supports a pulley 15 moved by a specific belt 16 and transmitting the motion to the driving wheel 5.

The belt 16 may be a V-belt, a toothed belt, a chain or another kind of belt, without departing from the protective scope of the present invention, so that the pulley 15 is a pulley suitable for the type of running belt.

In particular, furthermore, with reference to the embodiment shown in FIGS. 2-4, the driving system consists of a first 15 and a second 17 pulley, for each supporting shaft 6. The disassembly and the reassembly of the conveying system 100 are made easier and quicker by to two pulleys 15, 17.

In order to use only one supporting shaft 6, for the sake of construction and maintenance simplicity of the conveying system 100, the two pulleys 15, 17 are assembled fixedly on the same supporting shaft 6.

The first 15 of the two pulleys, preferably the one axially adjacent to the inner side wall 22 of the supporting frame 2, 3 is designed to directly move the driving wheel 5, whereas the second pulley 17 is designed to transfer the motion, in other words it transfers the motion by a belt 16 to another first pulley 15 directly designed for the movement of a wheel 5, preferably to the first pulley 15 of an adjacent wheel 5.

With reference to the embodiment shown in the drawings and, in particular, to FIG. 3, it can be seen a pulley 18 keyed on the output shaft 19 of a motor 20, and this transfers the motion to a first pulley 15 of a wheel 5 by means of a belt 21.

The driving system, namely the belt and pulley assembly, adapted to transfer the motion from the wheel 5 to the other, or alternatively from a roller 4 to the other, is fully enclosed inside the tubular frame 2 or 3 so as to reduce bulk or operator safety problems and, at the same time, giving an aesthetic value to the conveying system not being affected by kinematic and wheel systems outside the frame.

The motor 20 is preferably an electric motor, although different kind of motors could be used without departing from the protective scope of the present invention.

Each supporting tubular frame 2 or 3 is made of two substantially specular and symmetric half-shells 2a, 2b, 3a, 3b joined together by locking means, not shown in the figure.

By way of example, screws and bolts can be provided as locking means adapted to engage in corresponding slots, generally positioned in the lower portion of the tubular frame itself, in both the half-shells 2a, 2b, 3a, 3b.

To render the two half-shells 2a, 2b, 3a, 3b more stable, once they are closed, the profile comprises a crossbeam composed of a fork-shaped element 53 and a bracket-shaped element 54, adapted to be coupled with the prongs of the fork-shaped element 53.

In detail, the fork-shaped element 53 extends horizontally from an inner wall of a half-shell 2a, 2b, 3a. 3b and it couples with the bracket-shaped element 54 extending horizontally in a position corresponding to the inner wall of the remaining half-shell 2a, 2b, 3a, 3b.

The supporting shaft 6 of the wheels 5 or rollers 4, according to an embodiment, is a shaft adapted to have at least one portion with a shaped outer profile.

Such a portion, that could also extend all along the shaft, allows the engagement of the shaft in a counter-shaped seat arranged on the wheel 4 so that the latter could be keyed on the shaft 6.

Figure 5:
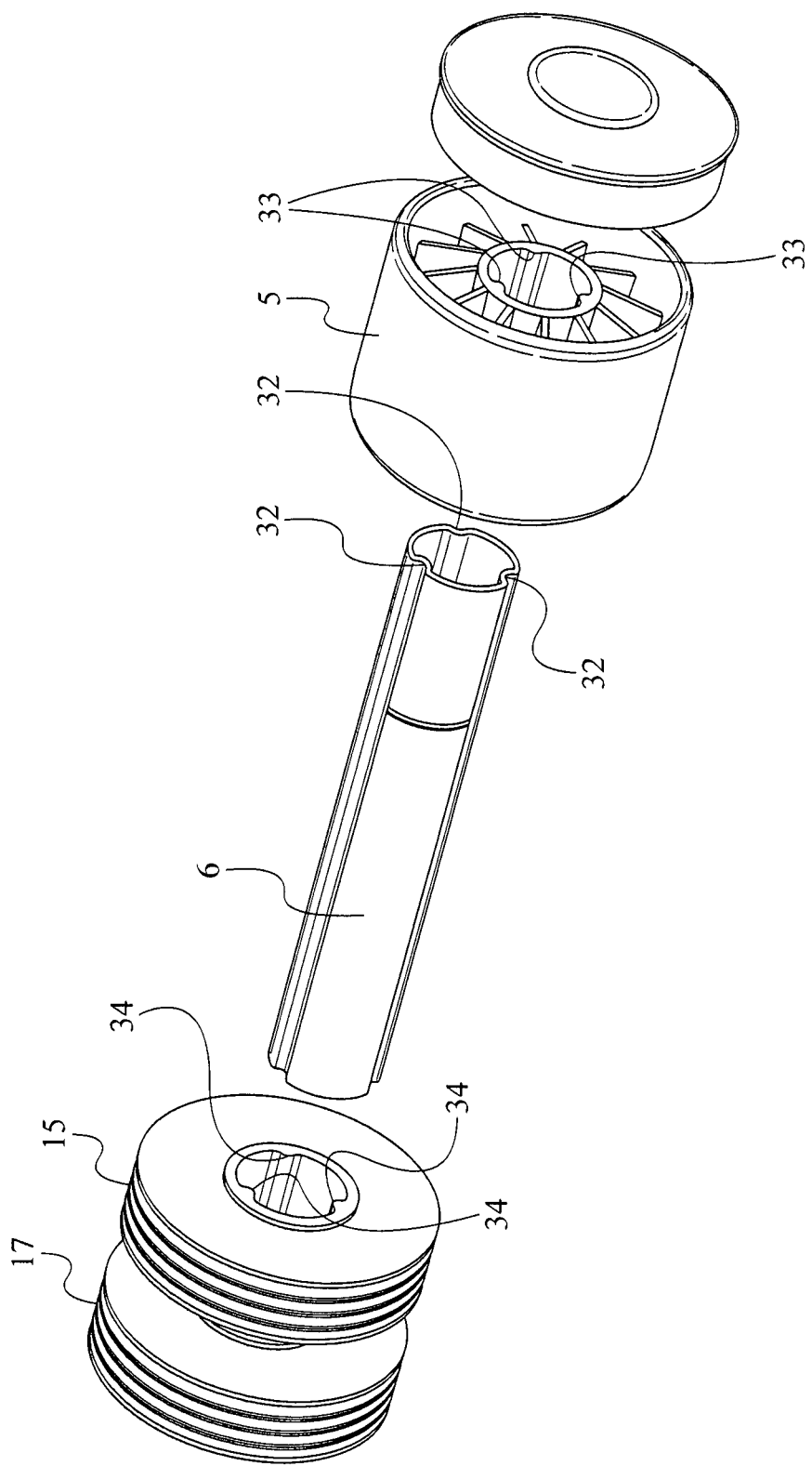
FIG. 5 is a schematic exploded view of some portions of the conveying system according to the present invention.

By way of example, with reference to the embodiment shown in FIG. 5, the supporting shaft 6 can be provided at least one preferably three, groove 32 extending all along the shaft and angularly spaced along the outer circumference of the supporting shaft 6.

The three grooves 32 are adapted to receive three counter-shaped ribs 33 of the wheels 5 or rollers 4 to engage the latter.

Again to facilitate the assembling and the subsequent maintenance of the conveying system as shown in FIG. 5, the pulleys 15, 17 have the same counter-shaped seat.

In addition, to provide for an easy assembling, also the pulleys 15, 17 can be provided with counter-shaped ribs 34 adapted to allow the pulleys 15, 17 to be keyed on the supporting shaft 6.

In FIG. 5 two pulleys 15, 17 are depicted as pulleys 15, 17 for multi-V belts.

Figure 6:
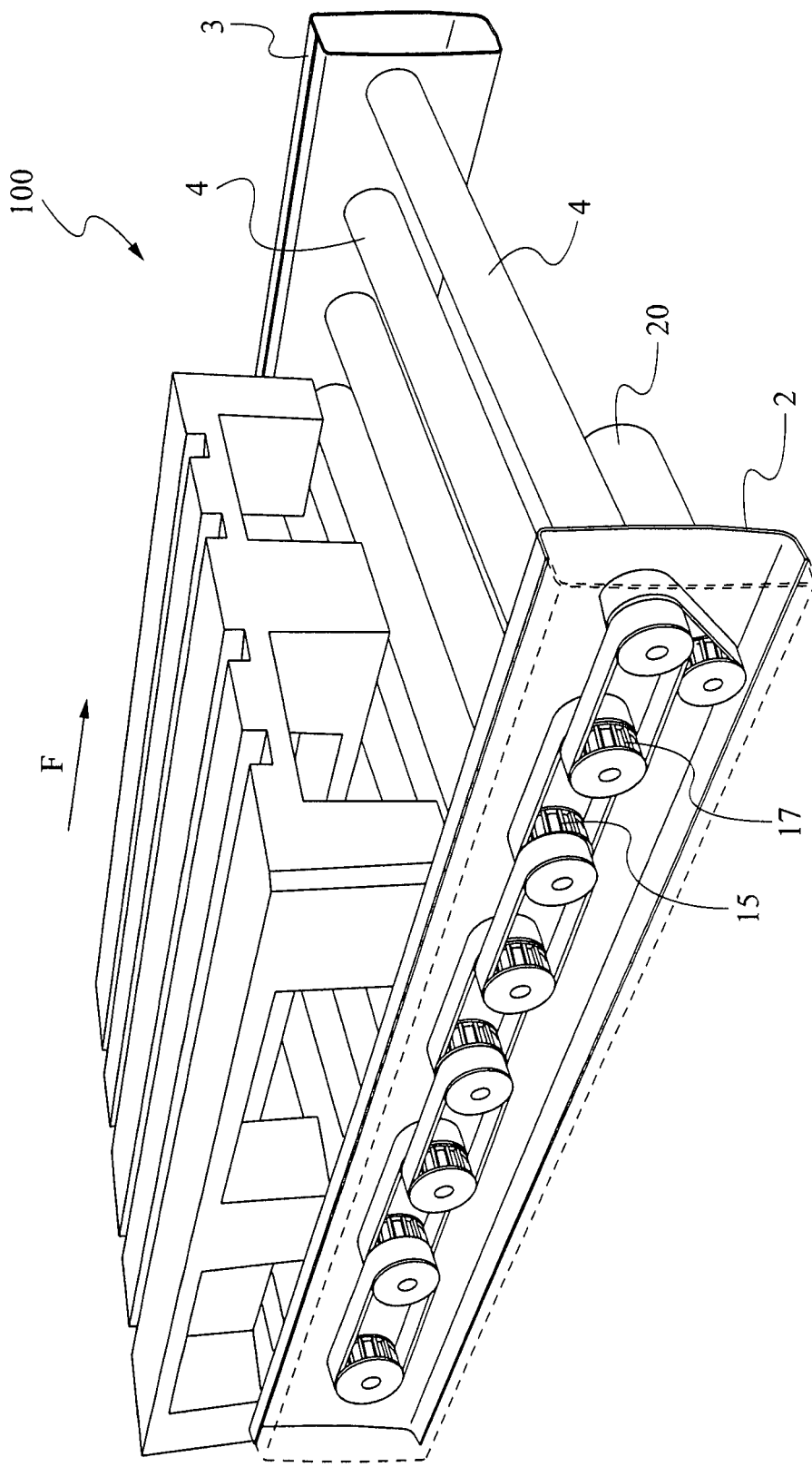
FIG. 6 is a schematic perspective view of a first embodiment of a conveying system according to the present invention.

FIG. 6 shows another embodiment of the conveying system 100 according to the present invention indistinguishable from that shown in FIGS. 1-5 with the exception of involving rollers 4 instead of wheels 5 and different kind of pulleys 15, 17.

In addition, in this embodiment, the tubular elements are made of metal, preferably steel coated with aluminium on the outside of the tubular element 2 or 3 and the ribs 13 do not extend in the extending direction of the conveying system 100 for the whole extension thereof, but only for short lengths.

In particular, the ribs 13 extend for a limited extension, in the extending direction of the conveying system 100, preferably for an extension equal to, or shorter than, the extension of the housing 8 in the afore said direction.

In this case the ribs 13 are made by punching and they may have holes to accommodate threads adapted to lock said housings 8 in position.

Figure 7:
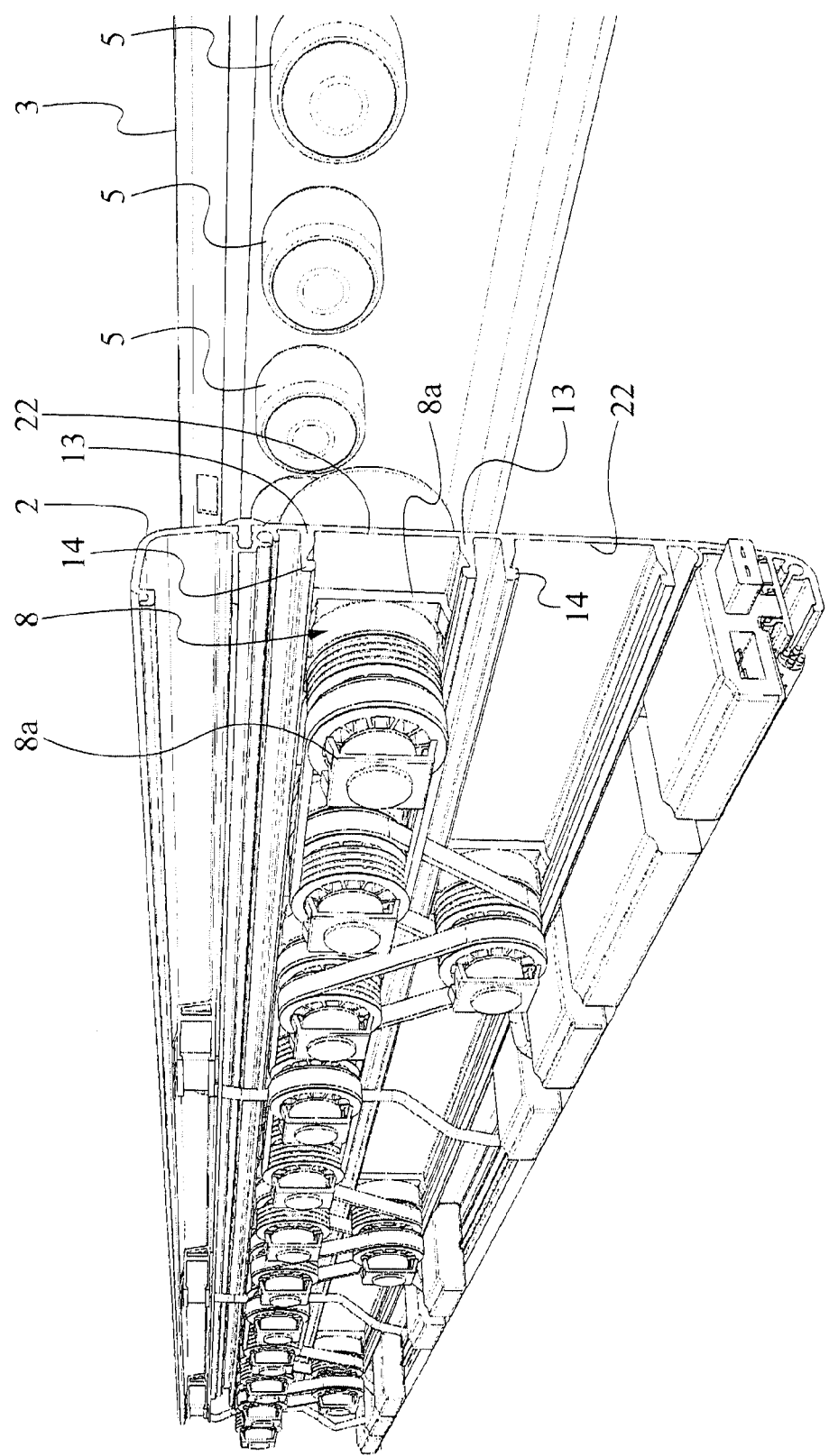
FIG. 7 is a partial schematic view of a second embodiment of the conveyor system according to the present invention.
Figure 8:
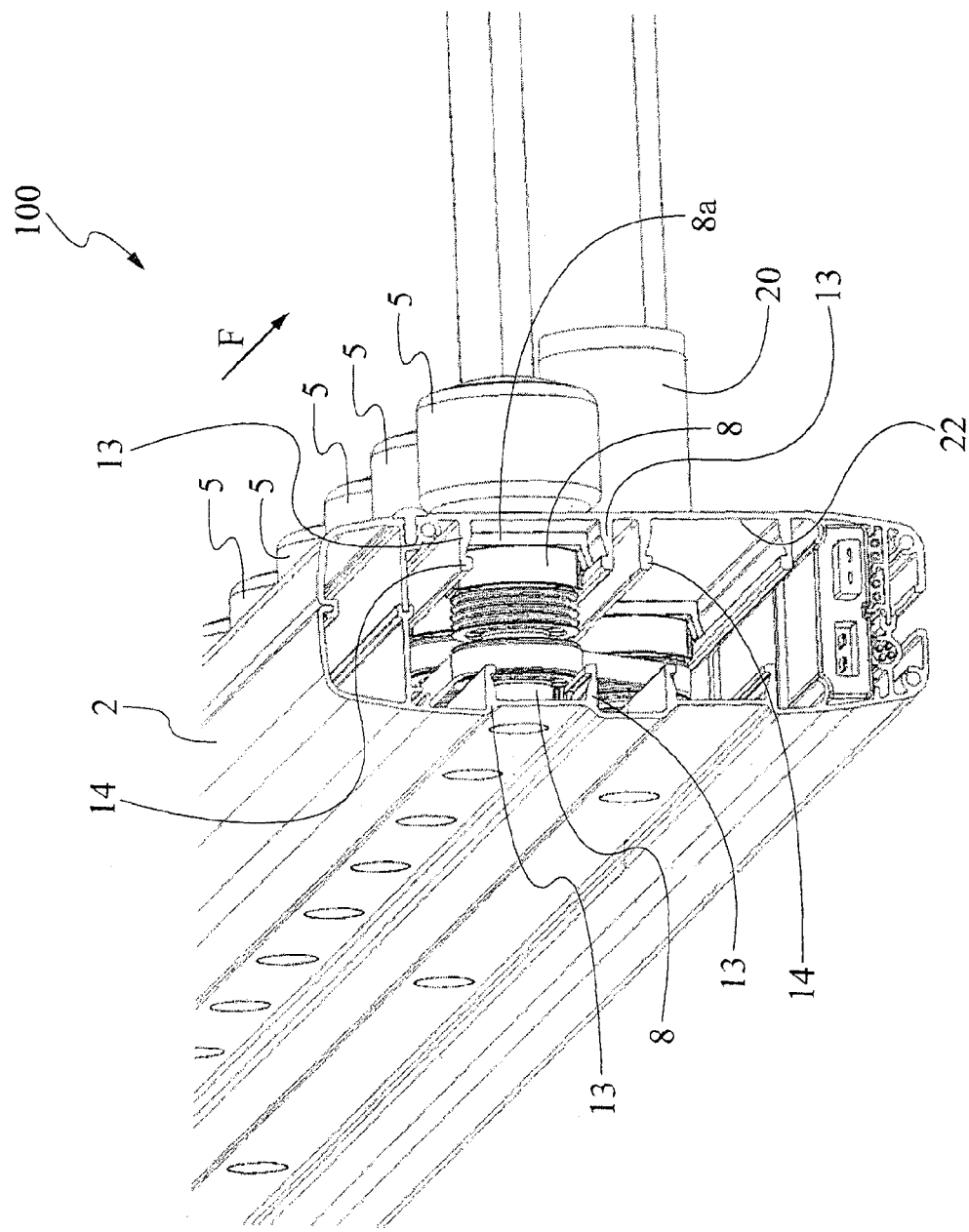
FIG. 8 is a partial schematic view of a second embodiment of the conveyor system shown in FIG. 7.
Figure 9:
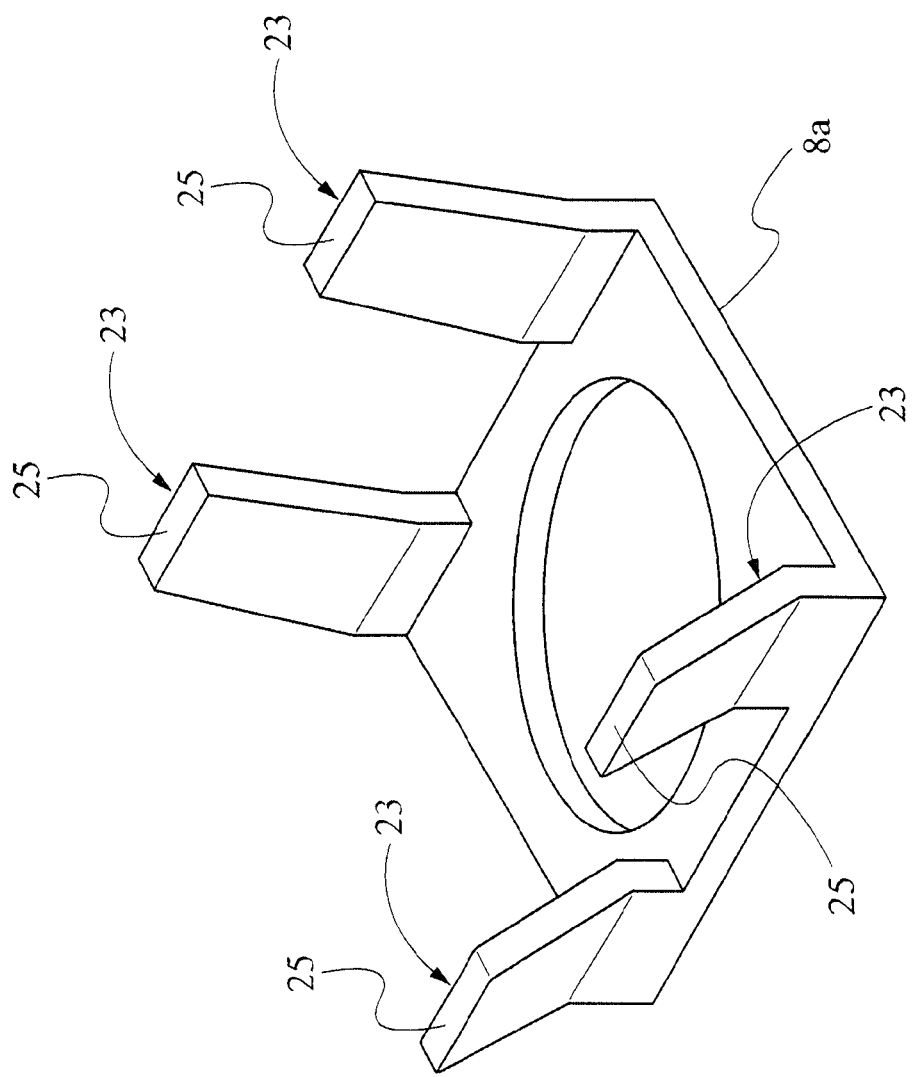
FIG. 9 is an enlarged view of a housing for a bearing according to the embodiment shown in FIGS. 7 and 8.

In the FIGS. 7-9 is shown an alternative embodiment of the conveyor system 100 very similar to that shown in the FIGS. 1-6 except for the shape of the housing 8, the fixing means 9 and the ribs 13. Even for this embodiment on the inner wall 22 of the tubular frames 2, 3 are present a pairs of ribs 13 which extend substantially for the whole extension of the conveyor system 100.

In each pair, the ribs 13 are placed at a distance, substantially equal to the maximum height H of the housing 8 or slightly higher.

The ribs 13 placed on the inner wall 22 of each tubular frame 2 or 3 extend axially towards the inside of the tubular frame and have at their free end a enlarged cross-section portion 14.

More in detail, each rib 13 extends from the inner wall to a first portion with a given section, which is followed by a second portion wherein the section of the rib goes to decrease gradually as it advances toward the interior of the tubular frame and it is followed by the enlarged cross-section portion 14.

The rib 13 is shaped so that the second portion and the enlarged cross-section portion 14 have a stylized hook shape and two ribs 13 of the same pair the stylized hooks are arranged so as to be mutually facing and abutting against the housing 8. In this embodiment the housing 8 has a flat base 8*a* substantially square with a maximum height H, corresponding to the maximum dimensions of the housing 8 in a direction orthogonal to the feed direction F.

In correspondence of the four vertices of the flat base 8*a* are provided lugs 23 projecting towards the inside of the tubular frame.

Preferably there are four projections 23 protruding imo inclined to diverge away from the flat base 8*a*.

Each lug 23 extends for a length such as to abut against the enlarged cross-section portion 14.

In detail the free ends of the projection 23 abuts against the enlarged cross-section portion 14 so as to be blocked from the hook formed by the enlarged cross-section portion 14 and the second portion of the rib 13.

Also according to this embodiment the support shaft 8 through the tubular element 2 or 3 is supported and locked in position with respect to the axially outer wall of the tubular element itself by means of a further housing 8 in turn bound by two ribs 13.

The present invention has been described referring to some embodiments. To the embodiments herein represented in detail may be made various modifications, anyway remaining in the protection scope of the invention, defined by the following claims.

The invention claimed is:

1. A conveying system (100), comprising:
    two axially spaced supporting tubular frames (2, 3) extending substantially parallel in the conveying direction (F) of the conveying system;
    at least one plurality of rollers (4) and/or wheels (5);
    at least one plurality of supporting shafts (6), each adapted to be engaged in at least one of said supporting tubular frames (2, 3) to support at least one driving roller (4) and/or at least one driving wheel (5);
    at least one first supporting bearing (7) for each supporting shaft (6); and
    at least one housing (8) for said at least one first supporting bearing (7),
    said housing comprising fastening means (9) to removably fasten said housing (8) and bearing (7) held therein within at least one supporting tubular frame (2, 3),
    said fastening means (9) comprising anchoring means adapted to removably engage in ribs (13) obtained on inner side walls (22) of said tubular frames (2, 3), and
    said ribs (13) axially extending inward the supporting tubular frame (2, 3) and have a portion provided with an enlarged cross section at their free end.

2. The conveying system (100) according to claim 1, wherein the conveying system comprises a driving assembly held within at least one supporting tubular frame (2, 3) and at least one motor (20) to drive said driving assembly.

3. The conveying system (100) according to claim 2, wherein the driving assembly is held within at least one supporting tubular frame (2, 3).

4. The conveying system (100) according to claim 2, wherein the driving assembly comprises at least one pulley (15) and at least one drive belt (16).

5. The conveying system (100) according to claim 4, wherein the driving assembly comprises at least one pulley (15) for each supporting shaft (6) operably connected by means of a drive belt (16) to the pulley (15) of the adjoining supporting shaft (6) and/or to the motor (20).

6. The conveying system (100) according to claim 2, wherein said anchoring means comprise juts (23) projecting from said housings (8) comprising a stop element (25) arranged to abut against the enlarged cross-section portion (14) of said ribs (13).

7. The conveying system (100) according to claim 1, wherein said anchoring means comprise juts (23) projecting from said housings (8) comprising a stop element (25) arranged to abut against the enlarged cross-section portion (14) of said ribs (13).

8. The conveying system (100) according to claim 1, wherein said projecting juts are flexible.

9. The conveying system (100) according to claim 1, further comprising:
    at least one second supporting bearing (7) for each supporting shaft (6).

10. The conveying system (100) according to claim 1, wherein each supporting frame (2 or 3) comprises two half-shells (2*a*, 2*b*; 3*a*, 3*b*) joined together.

11. The conveying system (100) according to claim 10, wherein the two half-shells (2*a*, 2*b*; 3*a*, 3*b*) of the same tubular element are symmetric with respect to their extending direction.

12. The conveying system (100) according to claim 1, wherein each supporting frame (2 or 3) comprises a cross-member comprising at least one fork element (53) comprising at least two prongs and a cantilever (54) adapted to be coupled with the prongs of the fork element (53).

13. The conveying system (100) according to claim 1, wherein the supporting shaft (6) crosses the tubular element (2, 3) and it is supported and locked in position with respect to the axially outer wall of the tubular element itself by means of a further housing (8) in its turn constrained by two ribs (13).

14. The conveying system (100) according to claim 1, wherein the ribs (13) are manufactured by punching and comprise holes or slots configured for receiving screws.

* * * * *